(12) United States Patent
Hessing

(10) Patent No.: US 7,277,048 B2
(45) Date of Patent: Oct. 2, 2007

(54) ASSET TRACKING METHOD

(75) Inventor: Dale Hessing, Eagle, ID (US)

(73) Assignee: Preco Electronics, Inc., Boise, ID (US)

( * ) Notice: Subject to any disclaimer, the term of this patent is extended or adjusted under 35 U.S.C. 154(b) by 196 days.

(21) Appl. No.: 10/900,482

(22) Filed: Jul. 27, 2004

(65) Prior Publication Data

US 2006/0022867 A1 Feb. 2, 2006

(51) Int. Cl.
 *G01S 5/14* (2006.01)
(52) U.S. Cl. ............ 342/357.03; 342/357.07; 342/357.09
(58) Field of Classification Search ....... 342/357.03, 342/357.06, 357.07, 357.09; 701/213, 215
See application file for complete search history.

(56) References Cited

U.S. PATENT DOCUMENTS

| | | | |
|---|---|---|---|
| 5,563,607 A * | 10/1996 | Loomis et al. | 342/357.03 |
| 5,899,957 A * | 5/1999 | Loomis | 701/214 |
| 6,369,755 B1 * | 4/2002 | Nichols et al. | 342/357.17 |
| 6,433,739 B1 | 8/2002 | Soliman | 342/387 |
| 6,453,237 B1 | 9/2002 | Fuchs et al. | 701/213 |
| 6,459,989 B1 * | 10/2002 | Kirkpatrick et al. | 701/215 |
| 6,496,141 B2 * | 12/2002 | Pippin | 342/357.08 |
| 6,611,755 B1 | 8/2003 | Coffee et al. | 701/213 |
| 6,700,533 B1 | 3/2004 | Werb et al. | 342/357.07 |
| 2002/0183071 A1 | 12/2002 | Shioda et al. | 455/456 |
| 2003/0036847 A1 | 2/2003 | Geier et al. | 701/209 |

* cited by examiner

*Primary Examiner*—Dao L. Phan
(74) *Attorney, Agent, or Firm*—Pedersen & Co., PLLC; Ken J. Pedersen; Barbara S. Pedersen

(57) ABSTRACT

The present invention relates to a system for managing assets such as vehicles and/or equipment in an area such as a repair yard or parking lot. A plurality of mobile devices periodically wake-up at different times and transmit their uncorrected GPS location data to one or more fixed local devices. Each fixed local device periodically forwards its accumulated, uncorrected GPS data for each mobile device to a reference device. A reference device is precisely located and capable of differentially correcting the data and forwarding the corrected result sets either back to the local devices and/or to third parties.

2 Claims, 6 Drawing Sheets

| PROCESS STEP | INITIALIZE | COLLECT MOBILE UPDATES | | | | UPLOAD ALL | DISPLAY MAP |
|---|---|---|---|---|---|---|---|
| TIME | T0 | T1 | T2 | ... | Tn | Tn+1 | Tn+2 |
| MOBILE TRACKING DEVICE NUMBER | | 1 | 2 | ... | n | | |
| MOBILE TRACKING DEVICE FUNCTION | SET WAKE-UP TIMER SLOTS | WAKE-UP, SEND PACKET | WAKE-UP, SEND PACKET | ... | WAKE-UP, SEND PACKET | | |
| LOCAL FIXED DEVICE FUNCTION | GENERATE BASE MAP DISPLAY | RECEIVE AND STORE DATA | RECEIVE AND STORE DATA | ... | RECEIVE AND STORE DATA | TRANSMIT CUMULATIVE DATA | RECEIVE AND UPDATE MAP DISPLAY |
| REFERENCE DEVICE FUNCTION | | | | | | RECEIVE AND PERFORM DIFFERENTIAL CORRECTIONS | TRANSMIT CORRECTED MAP INFORMATION |

FIGURE 3

ASSET TRACKING METHOD

BACKGROUND OF THE INVENTION

1. Field of the Invention

This invention relates to location tracking systems for fleets of vehicles, heavy equipment or other moveable assets.

2. Related Art.

The NAVSTAR Global Positioning System (GPS), developed and implemented by the U.S. Department of Defense, uses position and time information broadcast from a constellation of up to 24 satellites, moving in non-geosynchronous orbits, to allow determination of the present time, observer location and velocity adjacent to the Earth's surface. In many different applications of use of this information, there have been systems developed for tracking vehicle position, monitoring of fleet vehicle routing and for providing navigation information to drivers. None of the previous inventions or products that are known in the art or commercially, however, provide the features of the present invention. This invention provides benefits as a low-cost inventory and asset tracking system, especially in equipment yards and asset control areas, where large inventories of vehicles and/or equipment are stored, moved and/or tracked as to their whereabouts.

In comparing the present invention to other similar position tracking systems, it should be noted that position tracking data according to the present invention are forwarded to, processed and managed at a fixed reference location site or sites, and also that the processed, corrected data are kept at the fixed location site or sites, and not transmitted back to the mobile equipment or vehicles that are being located or tracked.

By establishing this uni-directional data flow from mobile units to the fixed local units, the circuitry that is incorporated into the plurality of vehicles or assets will be simpler and lower in cost, as compared with the circuitry of the mobile equipment found within other position tracking systems known in the art. Since, according to the present invention, extra circuitry and peripheral hardware necessary for data processing and storage are comprised within a fixed location site or sites, the quantities of these more complex and expensive circuits will be far fewer than if these circuits were located within each vehicle or other asset.

In U.S. Pat. No. 6,611,755 B1 to Coffee et al., a vehicle fleet management system is described, which has application in tracking the activities of slurry, aggregate and ready-mix concrete trucks.

In U.S. Pat. No. 6,453,237 B1 to Fuchs et al., describes an apparatus and method is described by which vehicle position is determined based upon receipt at the vehicle of GPS satellite signals and receipt of the differential correction data provided by fixed location devices. Similar to Coffee et al. above, this invention relies upon receiving and processing of information at each vehicle, requiring more complex and expensive circuitry.

In U.S. Pat. No. 6,700,533 to Werb et al. is described a system which requires that the fixed local devices be accurately geo-positioned prior to use and capable of making differential GPS corrections.

SUMMARY OF THE INVENTION

Vehicle and asset information systems have been developed in the industry that provide various types of information to the operators and or yard controllers of those vehicles or assets. With these systems, there are typically cost constraints associated with providing higher levels of accuracy needed to pinpoint the location of assets to within several meters, which is a requirement for vehicles or assets located close-together, such as in parking lots or equipment yards.

There are a number of errors associated with GPS ranging, including errors due to noise, multipath reception, ionization of the Earth's atmosphere and clock skew. The geometry of various satellite positions can also magnify these errors. These combined error factors drive the need for enhancements to standard GPS, such that higher accuracy is obtained.

One enhancement to standard GPS technology is Differential GPS (DGPS), which involves a reference GPS receiver that is stationary and has initially had its position accurately surveyed. To understand DGPS, it is important to know that satellite signal errors typically have a high spatial and temporal correlation. Therefore, if two receivers are fairly close to each other, the signals that reach both of them will have traveled through virtually the same slice of atmosphere, and will have virtually the same errors. If the stationary reference receiver is used to measure errors, it can then provide error correction information to the fixed local receivers.

The reference receiver receives the same GPS signals as the other receivers, and it uses its known position to calculate timing. It calculates what the travel time of the GPS signals should be, compares them to what they actually are, and then transmits differential corrections to the fixed local devices, in order to correct their measurement. Since the reference receiver doesn't know which of the many available satellites a fixed local receiver might be using to calculate is position, the reference receiver computes errors for all visible satellites. With DGPS, fixed local receivers apply the differential corrections to the particular satellite data they are using, based on this correction information sent from the reference location. A DGPS reference receiver can also use carrier measurements and pseudorange data to provide even greater accuracy to fixed local devices or to third parties. These can be used to further improve position accuracy through differential carrier positioning methods.

The present invention is a system and a method of providing accurate, DGPS corrected asset location data. This invention comprises a system that is easy to install and use, and, as described above, may be provided at a lower cost than other location management systems found commercially or in the prior art. According to the present invention, a GPS equipped mobile device determines its location and communicates it to a fixed local device receiver via RF data radio. For typical vehicle or asset management applications, GPS receiver systems from vendors such as SiRF Technology of San Jose, Calif. and Trimble Navigation Limited of Sunnyvale, Calif. are commercially available and are suitable for incorporation into the electronics both for mobile and fixed local devices of the present invention. Communication chip sets for standard data radio protocols, such as 802.11 are also commercially available for low-cost.

The low-cost GPS receiver used in the mobile and fixed local devices of the present invention provides relatively inaccurate position estimates at a low cost. These uncorrected position estimates are transmitted from the mobile devices to one or more fixed local devices. The fixed local device or devices accumulate data from each of the mobile devices in its managed domain of such devices and forwards on this uncorrected data to one or more reference devices by way of an RF data transmitter. Differential corrections are then applied at the reference location device using the more expensive DGPS receiver, and this corrected data can then be transmitted back to fixed local devices, and/or can be forwarded to third party equipment.

An example of an available DGPS receiver suitable for such an application is Trimble's Inverted Differential GPS Base Station product. The DGPS receiver will necessarily be installed at a pre-surveyed location. Such a DGPS receiver has the capability to determine the errors received from each satellite in view. It then applies these corrections to the uncorrected data it has received from the one or more fixed local devices in its managed domain. The result is an improved estimate of each mobile device position, accurate to 2-5 meters.

Such a system provides the following benefits:
1. Low-cost GPS and RF data transmission circuitry is possible in each mobile device.
2. Low-cost GPS circuitry is possible in fixed local devices.
3. Accurately surveyed locations are not required for fixed local devices, making them easily locatable or re-locatable.
4. Only a single, costlier DGPS device is required, typically at a single, accurately surveyed reference location, in order to ascertain accurate position information of all other devices in the system.
5. Such a system may be quickly easily installed or re-located, as would be beneficial for tracking asset or vehicle locations for military, police, fire, disaster relief, construction site or other intensive logistical situations.

BRIEF DESCRIPTION OF THE DRAWINGS

FIG. 3 is a table of process steps that are accomplished in the present invention.

DETAILED DESCRIPTION OF THE INVENTION

Figure 1:
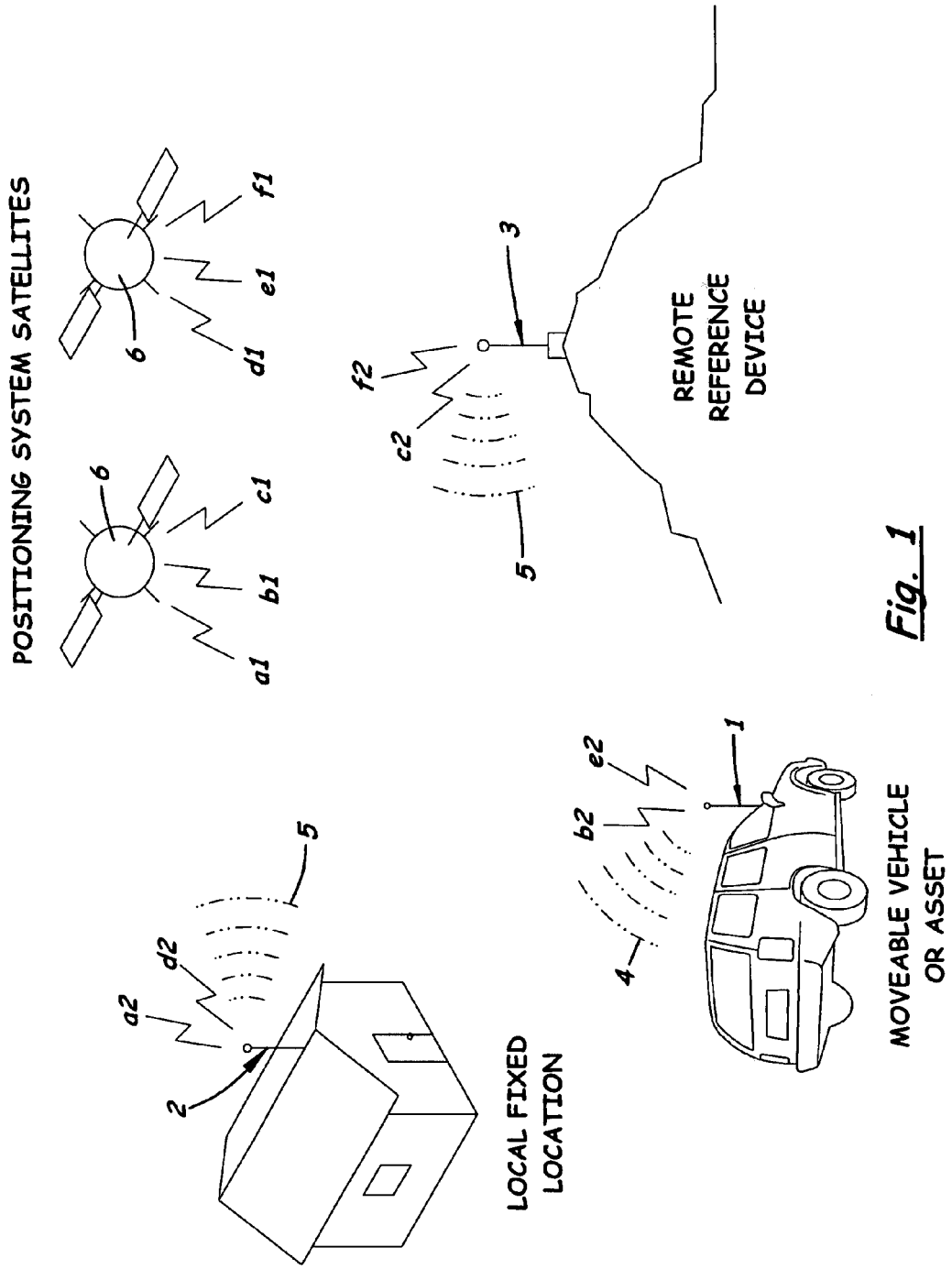
FIG. 1 is a schematic diagram of a physical placement of various devices of the present invention.

FIG. 1 is a schematic diagram of one embodiment of the present invention. It depicts a mobile device 1 within a vehicle, a fixed location device 2 within a structure, a reference device 3 within a structure, and a set of positioning system satellites 6, which can be NAVSTAR GPS satellites or satellites from an alternate positioning system. Radio waves are depicted between the positioning system satellites 6 and ground receivers 1, 2 and 3 as rays a1, a2, b1, b2, c1, c2, d1, d2, e1, and e2. Radio path 4 is a uni-directional path from any mobile device 1 to a fixed location device 2. Radio path 5 is a bi-directional path between fixed location device 2 and reference device 3. Typically, a fixed location device 2 is located within close proximity to the mobile devices 1 that are being tracked. Reference device 3 can be located remotely from fixed location devices 2. A precise geographical reference location must be known by reference device 3, so that it has the capability of performing DGPS corrections.

A precise location is not needed, however, for any fixed location device 2 within the system of the present invention.

Figure 2:
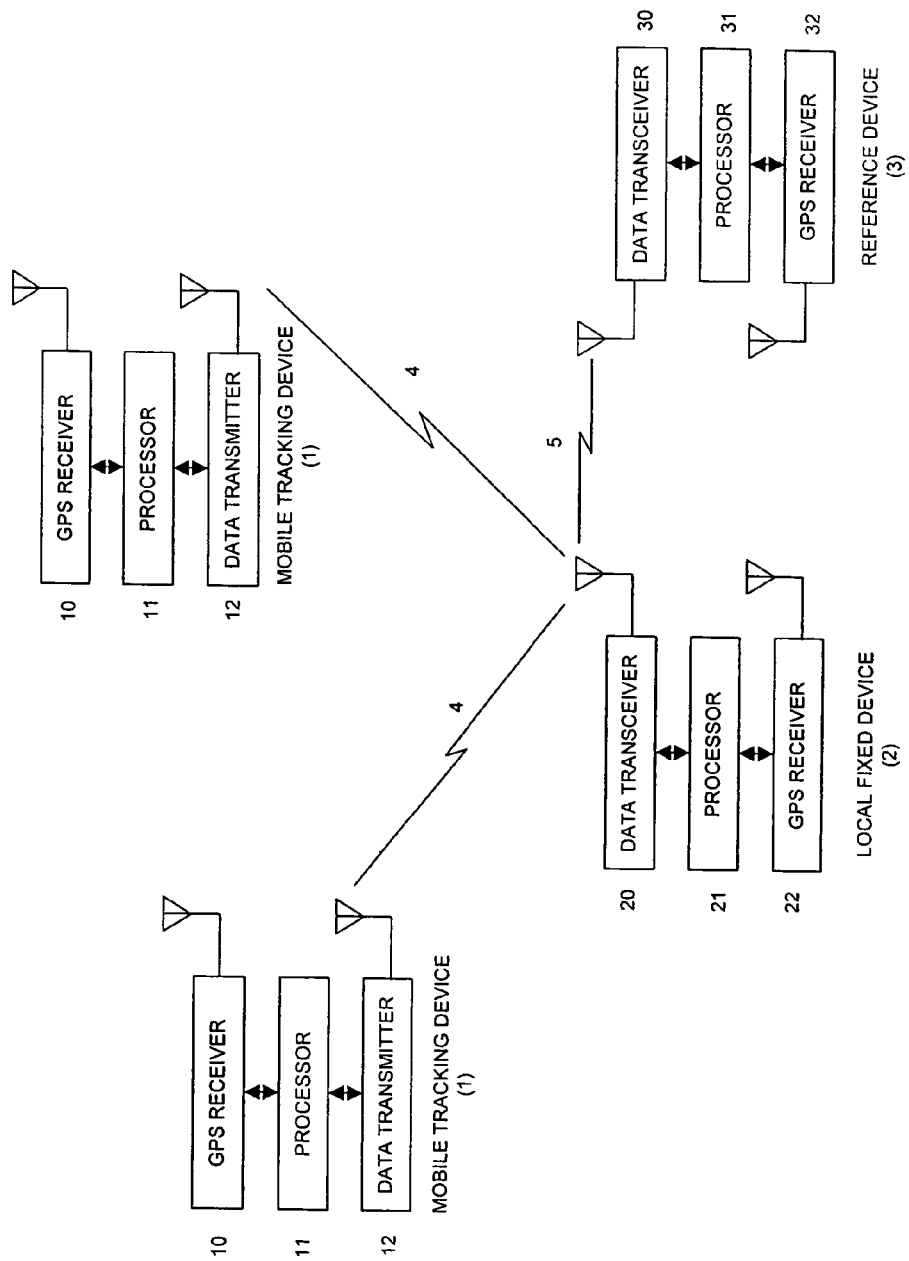
FIG. 2 is a schematic block diagram of one embodiment of the present invention.

Referring to FIG. 2, each mobile tracking device 1 comprises an internal GPS receiver 10, a processor 11 and a data transmitter 12. A typical local fixed device 2 comprises a data transceiver 20, a processor 21, and a GPS receiver 22. This device 2 may also incorporate an input keypad or keyboard and a display, or a data interface, such as USB, to facilitate local monitoring and control of the system.

A typical reference device 3 comprises a data transceiver 30, a processor 31, and a GPS receiver 32. A significant cost savings can be realized by elimination of a data receiver in the mobile tracking devices 1. Since every asset or vehicle being managed in a yard or lot would typically be equipped with mobile tracking device 1, cost reducing this device yields the greatest savings, as compared with cost reducing other devices in the system. FIG. 2 also depicts radio paths 4 and 5, as described above. Data transceiver 20 comprised within fixed location device 2 is able to receive signals both from a plurality of data transmitters 12 and from reference device data transceiver 30, thereby also providing a saving through its combined utility.

FIG. 3 is a table of process steps that are accomplished in the present invention. At the Initialize Step at Time T0, each mobile device 1 establishes it's transmit time and then puts itself to sleep. Each local fixed device 2 can generate an initial display, for example, if said device is fitted with or is communicating with a local display. At pre-programmed times T1 through Tn, each mobile device 1 transmits its data packet, in-turn, to the local fixed device 2, and then each device 1 returns to its low-power standby mode. The receiving local device 2 stores the packets from each mobile device. The packet data comprises uncorrected GPS location and time-stamp. It may also comprise additional environmental or equipment data as required. For example, data that could be sampled and forwarded can include engine and vehicle operating parameters and cargo temperatures. Once all of the mobile devices have been received, then the accumulated, uncorrected data is transmitted at Tn+1 to reference device 3. Reference device 3 then performs DGPS corrections, and at Tn+2 transmits this corrected data back to the local fixed device 2 and/or to one or more third parties. If the destination of data is a local fixed device 2 that is suitably equipped, or can communicate with a graphic display, then a map graphic dataset and/or other beneficial graphical depiction datasets can be presented as aids in performing vehicle or asset management.

Figure 4:
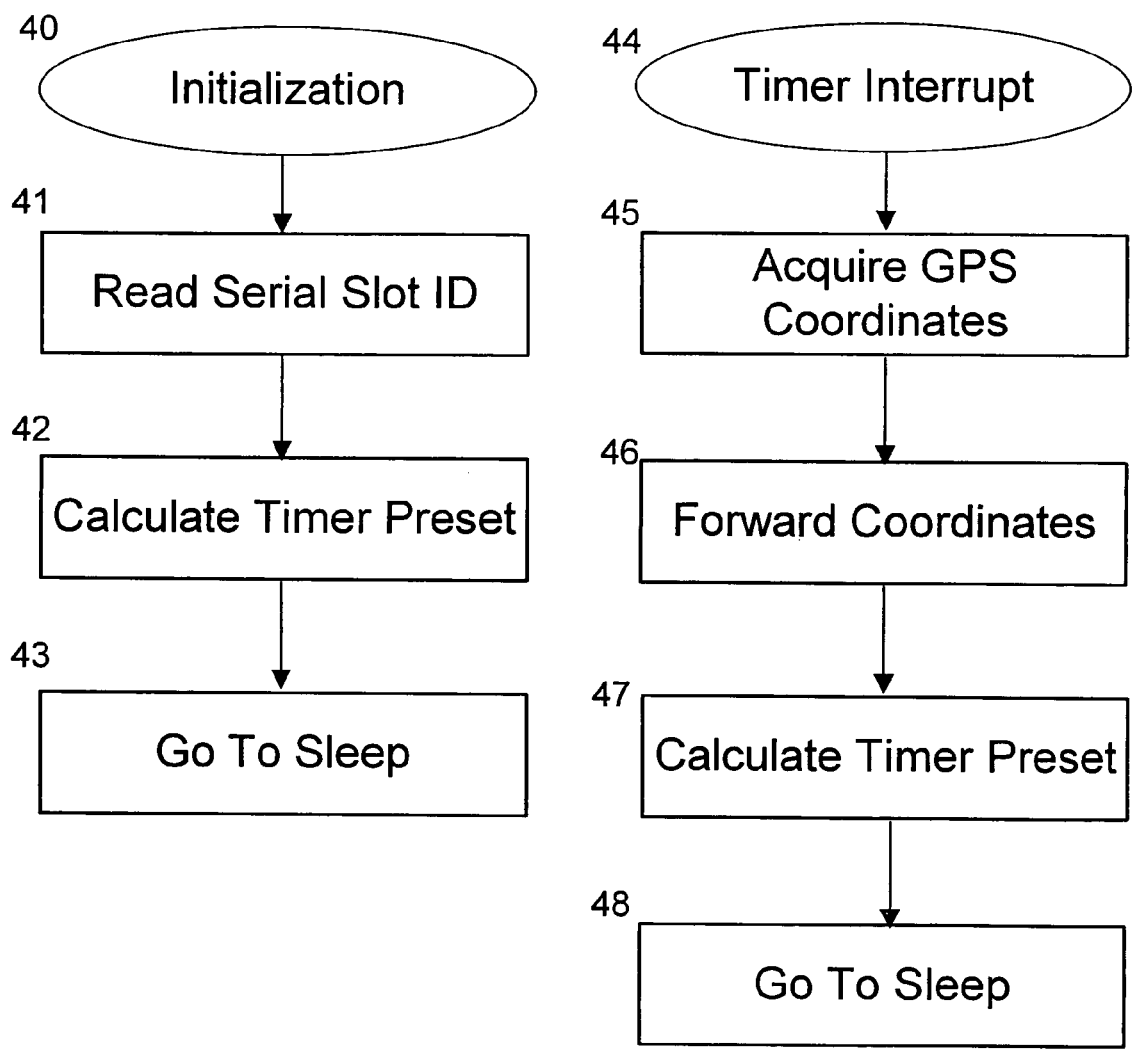
FIG. 4 is a flowchart depicting process flow in the mobile tracking device of the present invention.

Referring now to FIGS. 2 and 4, FIG. 4 is a flowchart depicting process flow in a mobile tracking device of the present invention. At time of program initialization 40, the mobile tracking device processor 11 begins by reading its Serial Slot ID 41 from a selection device such as a switch array, or a non-volatile memory.

The Serial Slot ID 41 parameter allows calculation of a unique wake-up time, where a timer preset value is calculated and loaded at step 42 for operation of a wake-up timer in processor 11. A timer value can be calculated such that the time slot transmission of packets T1 through Tn to a local fixed device from mobile tracking devices will not collide with time slot packets from any other mobile tracking devices within the local system. Since the GPS receiver can provide highly accurate real-time data, unique timer value calculations are straightforward and known in the art. The parameters of the preset calculation include the real time reading, the packet duration and the slot number.

The processor goes into sleep mode in step 43, after completing the timer preset. Once a timer interrupt occurs, the processor wakes up and interrogates the GPS receiver for a coordinate update at step 45. While the new coordinates are being computed, the most recently stored coordinates are forwarded on to the local fixed device at step 46. At step 47 the timer preset value is re-calculated from the new real-time and loaded. The processor then goes into sleep mode in step 48 until its next timer interrupt.

Figure 5:
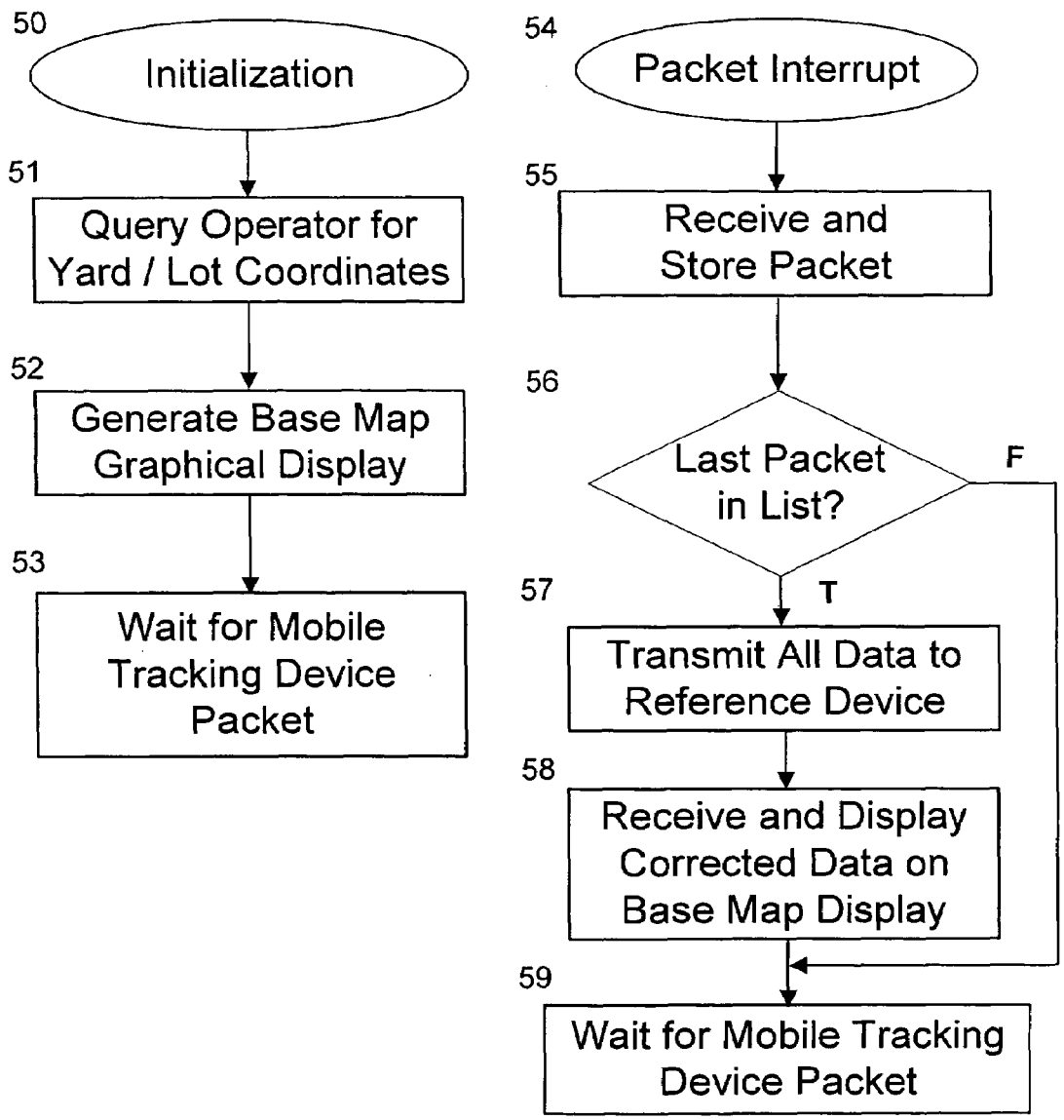
FIG. 5 is a flowchart depicting process flow in the local fixed device of the present invention.

Referring now to FIGS. 2 and 5, FIG. 5 is a flowchart depicting process flow in the local fixed device of the present invention. At time of boot-up or program initialization 50, the device processor 21 begins by optionally generating appropriate queries and gaining response from a yard operator or similar user, such that the boundary coordinates of a yard or lot and other such initial data parameters may be entered at step 51 into a data record describing the local environment. With this data, a map depicting the local area can be generated. This map can be generated at step 52 from locally stored map data or remote map data, such as might be accessed via transceiving data radio link or via a modem and a wired link. The processor can then wait for incoming packets to process at step 53.

Once a packet arrives, a packet interrupt occurs at step 54 and the data is stored at step 55. If the packet is the last in the list at step 56, then it is time to transmit all data to the reference device at step 57. The reference device, in turn, computes the DGPS correction data and transmits it back to the local fixed device in step 58. The processor can then wait for incoming packets to process at step 59.

Figure 6:
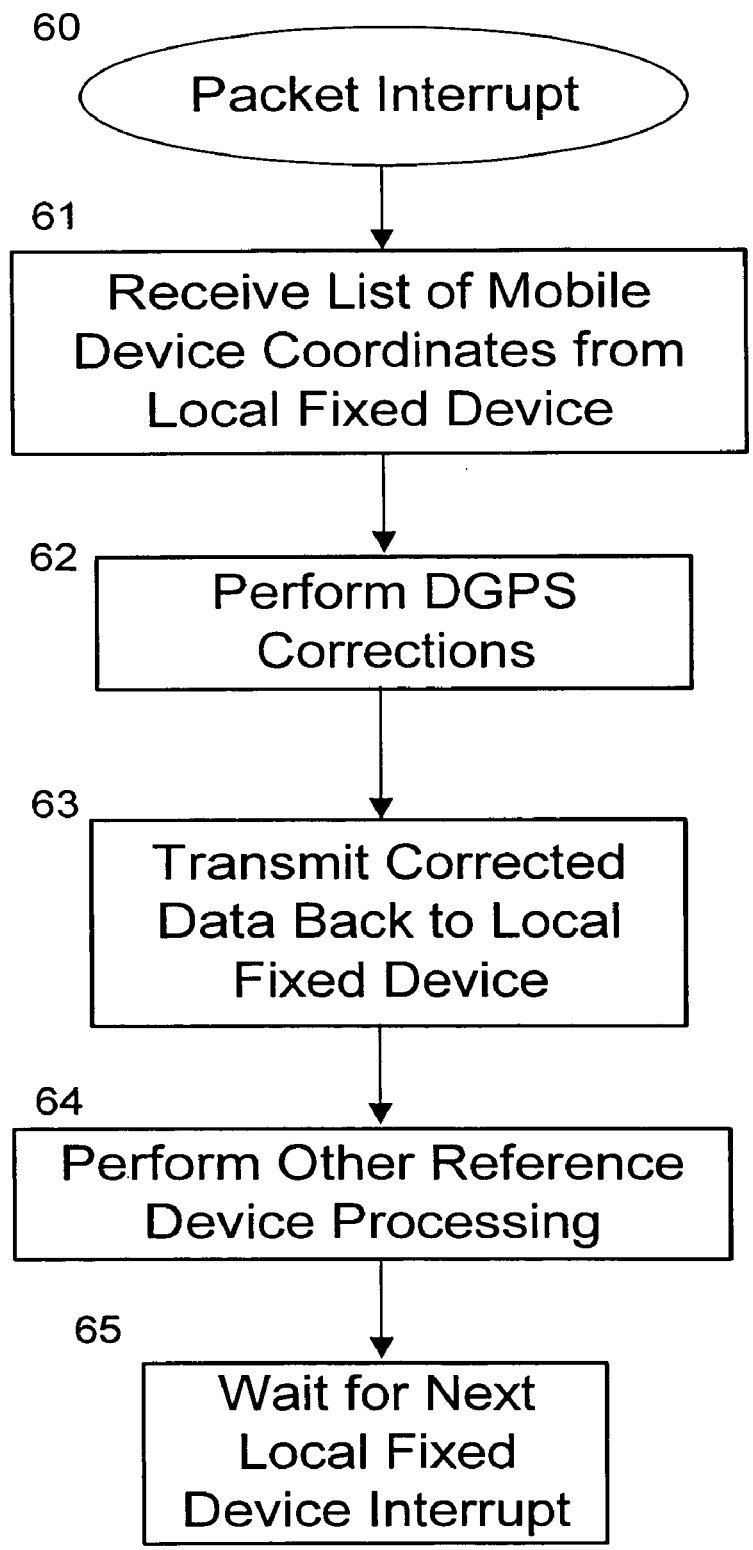
FIG. 6 is a flowchart depicting process flow in the reference device of the present invention.

Referring now to FIGS. 2 and 6, FIG. 6 is a flowchart depicting process flow in the reference device of the present invention. Upon receiving a packet interrupt from a local fixed device at step 60, the processor 31 in the reference device receives a list of mobile device coordinates from a local fixed device at step 61. The reference device then performs DGPS corrections to the received mobile device coordinate data at step 62 and transmits back the corrected mobile device coordinate data at step 63. The processor then performs any additional local reference processing at step 64, then waits for incoming packets to process at step 65. The foregoing description has been presented for purposes of illustration and description. It is not intended to be exhaustive or to limit the invention to the precise forms disclosed. It is intended that the scope of the invention be defined by the following claims and their equivalents.

I claim:

1. An asset tracking system comprising:
    a mobile tracking device comprising:
        a non-differential GPS receiver, a processor, and a digital data transmitter;
    a local fixed device comprising:
        a non-differential GPS receiver, a processor, and a digital data transceiver; and
    a reference device comprising:
        a differential GPS receiver, a processor, and a digital data transceiver;
    wherein said mobile tracking device receives uncorrected GPS-based position information and transmits said information uni-directionally to the local fixed device;
    wherein said local fixed device receives said uncorrected GPS-based position information from said mobile tracking device and transmits said information to said reference device;
    wherein said reference device receives and applies differential corrections to said transmitted uncorrected information; and
    wherein said reference device, and no other device, prepares corrected information for re-transmission, but not to the mobile tracking device.

2. A method for tracking mobile assets, the method comprising:
    providing a mobile tracking device comprising:
        a non-differential GPS receiver, a processor, and a digital data transmitter;
    providing a local fixed device comprising:
        a non-differential GPS receiver, a processor, and a digital data transceiver;
    providing a reference device comprising:
        a differential GPS receiver, a processor, and a digital data transceiver;
    wherein said mobile tracking device receives uncorrected GPS-based position information and transmits said information uni-directionally to the local fixed device;
    wherein said local fixed device receives said uncorrected GPS-based position information from said mobile tracking device and transmits said information to said reference device;
    wherein said reference device receives and applies differential corrections to said transmitted uncorrected information; and
    wherein said reference device, and no other device, prepares corrected information for re-transmission, but not to the mobile tracking device.

* * * * *